US007122793B1

(12) United States Patent
Blanchard

(10) Patent No.: US 7,122,793 B1
(45) Date of Patent: Oct. 17, 2006

(54) ION DETECTING APPARATUS AND METHODS

(76) Inventor: William C. Blanchard, 27 Glen Alpine Rd., Phoenix, MD (US) 21131

( * ) Notice: Subject to any disclaimer, the term of this patent is extended or adjusted under 35 U.S.C. 154(b) by 0 days.

(21) Appl. No.: 11/080,089

(22) Filed: Mar. 14, 2005

Related U.S. Application Data

(62) Division of application No. 10/351,107, filed on Jan. 24, 2003, now Pat. No. 6,924,479.

(60) Provisional application No. 60/352,040, filed on Jan. 25, 2002.

(51) Int. Cl.
*B01D 59/44* (2006.01)
*H01J 49/40* (2006.01)

(52) U.S. Cl. ...................... 250/292; 250/287; 250/281; 250/282

(58) Field of Classification Search ................ 250/287, 250/286, 282, 288, 292, 281
See application file for complete search history.

(56) References Cited

U.S. PATENT DOCUMENTS 4,855,595 A * 8/1989 Blanchard ................... 250/287
5,109,157 A * 4/1992 Loen .......................... 250/287
6,639,213 B1 * 10/2003 Gillig et al. ................ 250/286
6,992,284 B1 * 1/2006 Schultz et al. .............. 250/287
2001/0032929 A1 * 10/2001 Fuhrer et al. ............... 250/281
2001/0032930 A1 * 10/2001 Gillig et al. ................ 250/288

* cited by examiner

*Primary Examiner*—Nikita Wells
*Assistant Examiner*—Johnnie L Smith, II
(74) *Attorney, Agent, or Firm*—John P. Costello

(57) ABSTRACT

Ion injection in a drift tube apparatus for mobility spectrometry was accomplished without conventional ion shutters such as the Bradbury-Nielson or similar designs common to such drift tubes. Instead ions were passed between the ion source and drift region by using time-dependent electric field gradients that act as ion barriers between ordinary drift rings. Benefits of this design are simplicity and mechanical robustness. This ion injection technique dynamically accumulates the ions created between shutter grid pulses, as does the Bradbury-Nielson method. The invention provides not only structural improvements to the well known apparatus, but also provides inventive methods for operating a drift tube apparatus in achieve maximum analyte injection efficiency and improving ion detection sensitivity. Improving ion detection sensitivity of drift tubes has practical experimental application. Incorporation of the inventive apparatus into a smoke detector is a further practical application of the invention.

4 Claims, 5 Drawing Sheets

ION DETECTING APPARATUS AND METHODS

REFERENCE TO RELATED APPLICATIONS

This patent application is a divisional of U.S. application Ser. No. 10/351,107, filed Jan. 24, 2003 now U.S. Pat. No. 6,924,479 which claims the benefit of U.S. Provisional Application No. 60/352,040 filed on Jan. 25, 2002.

BACKGROUND OF THE INVENTION

1. Field of Invention

This invention relates to a drift tube apparatus and more specifically to a drift tube apparatus which uses electric fields to generate dynamic ion barriers in the drift tube, also referred to as ion storage "wells." The invention also includes a method for manipulating the voltage gradients that are generated by the electric fields in a drift tube to achieve optimum dynamic collection of ions and the maximum sensitivity to detect these ions. The apparatus and methods described here have practical applications in the field of smoke detectors and ion mobility spectrometry.

2. Background

Drift tubes for the characterizing of gas phase ions date from the early 1900s and descriptions of numerous advanced designs and methods were available by the middle to late 1930s. The large number of experimental configurations that resulted eventually converged on a linear potential gradient that causes a linear ion drift direction in the drift region. Either positive or negative ions can be detected depending on the polarity of the potential gradient that is used. In a drift tube, ions are injected into one end of the drift tube, and drift to the other end where they impinge upon a plate called a detector. A high gain current amplifier connected to the detector provides an electrical output signal. Methods to inject ions into the drift region are based upon electric fields that were transverse to ion drift. Two designs have been popular for creating the transverse fields, namely the Bradbury-Nielson and the Tyndale-Powell designs.

In the Bradbury-Nielson ion shutter design, an electric field is created on adjacent parallel wires or "shutters" which contain alternate potentials. Fields between adjacent wires are usually 3 to 6 times that of the fields responsible for ion drift and penetration of ions through the shutter fields is effectively blocked when this potential difference is applied to the wires. Ion injection is accomplished by eliminating the transverse field by bringing wires to a common potential; ions are drawn through the shutter to drift under the influence of the field gradient along the whole drift tube. In a second approach for ion injection, fields are established between a set of parallel wire gauzes off-set and insulated by a few millimeters; this is the Tyndale-Powell design and was popular in several research laboratories.

Later shutter designs employed in drift tubes were designed so that the wires in the shutter were co-planar and separated by a distance of approximately 0.01 mm with fields of approximately 600V/cm between wires in contrast to the drift tube field of 300 to 450 V/cm. Currently a hybrid of the prior designs has parallel wires as in the Bradbury Nielson ion shutter which are arranged in separate planes as in the Tyndale-Powell design. In all these designs, the ion shutter comprises mechanically fragile components which complicates the design and manufacture of drift tubes. Nonetheless, the ion shutter is widely used in military and explosive sensing commercial drift tubes and is the subject of contemporary refinements. The only viable alternative to the ion shutter to date has been pulsed photon sources as illustrated by laser ionization.

In the 1980s and 1990s, ion movement was studied at ambient pressure using variations in the duration and location of electric field gradients in drift tubes that resembled mobility spectrometers. In particular, William C. Blanchard designed and demonstrated a planar drift tube where ions could be isolated based upon mobility by repeated passes through a drift region, this work being embodied in U.S. Pat. No. 4,855,595.

This demonstrated that ions at ambient pressure could be manipulated by varying electric fields established by ordinary drift ring electrodes. Subsequently, ion injection into a drift tube was shown using varying electric fields instead of a shutter grid and the concept of collecting ions between two higher electric field gradients suggested an ion barrier or ion storage "well" at ambient pressure. Since most of the ions being created were collected instead of being neutralized as was the case with a shutter grid, a much lower Curie radioactive source could be used. A 0.9uCi $^{241}$Am source was used with this ion barrier drift tube, instead of the 10 milliCi of $^{63}$Ni normally used with shutter grid drift tube designs.

The foregoing reflects the state of the art of which the inventor is aware, and is tendered with a view toward discharging the inventors' acknowledged duty of candor, which may be pertinent to the patentability of the present invention. It is respectfully stipulated, however, that the foregoing discussion does not teach or render obvious, singly or when considered in combination, the inventor's claimed invention.

SUMMARY OF THE INVENTION

Ion injection in a drift tube for mobility spectrometry was accomplished without conventional ion shutters such as with the Bradbury-Nielson design or similar designs common to such drift tubes. Instead the inventive apparatus passes ions between the ion source and the drift region by using time-dependent electric field gradients that act as dynamic ion barriers between ordinary drift ring electrodes. The inventive apparatus provides a number of structural improvements to the standard drift tube, that along with its associated electronics, can manipulate electric fields to produce ion barriers having a flat shape for increased sensitivity. The improvements can be used in Ion Mobility Spectrometry or "IMS". For this reason the inventive apparatus will be referred to herein as an Ion Barrier Mobility Spectrometer of "IBMS".

The inventive IBMS apparatus is mounted inside an electrically conductive structure. The mounting structure acts as a Faraday cage for the apparatus and allows for gas flow. This cage contains the electric fields that are used inside the apparatus, and prevents externally generated electric fields from influencing the ion barrier fields and prevents externally generated electric fields from being detected. The apparatus includes a region located between an ion source and a source shield that prevents unwanted ions generated by the ion source drifting from the source electrode to the drift tube. This region and the cage allow the control of the ion barrier fields to occur without interference from externally generated electric field influences. The apparatus further includes a detector shield that provides for an improved signal to noise ratio of the detected signals by preventing externally generated electric fields from interfering with ion detection signals. Both shields are perforated, and allow gas to flow through the apparatus, as is the section of the Faraday cage that is located outside the source shield electrode.

The apparatus employs two sequentially timed cycles.

During the first cycle, called the Collection/Time of Flight (TOF) cycle, ions are created at a region of the apparatus called the course which is near the source electrode and the ions are collected in a region of the apparatus called the collection well, near a collection well electrode, and, at the same time, ions that were previously in a different region of the apparatus called the trigger well, are released into a drift region, and upon release, the ions move toward a detector. The TOF of the ions in this drift region is measured.

During the second cycle, called the Compression cycle, ions that were previously stored at the collection well are moved to the trigger well and at the same time, ions that are continuing to be created by the source are moved to the source shield, where they are neutralized.

The invention provides not only structural improvements to the well known drift tube apparatus, but also provides inventive methods for operating a drift tube apparatus such as methods for improving analyte ionization efficiency, a method for achieving the Collection/TOF cycle, a method to measure relative sensitivity improvements, a method for achieving the Compression cycle, a method for improving the sensitivity of detecting ions in the drift tube apparatus, a method for preventing new ions from entering the drift tube apparatus during the Compression cycle, and a method for operating a "single well" drift tube apparatus where the collection well and trigger wells are combined into a single well. The inventive methods described herein depend upon the dynamic collection of the ions prior to their release into the drift region, instead of destroying the ions created between shutter grid pulses as does the Bradbury-Nielson method. Thus a less energetic ion source is required for the same quantity of detected ions with the inventive apparatus and methods.

The IBMS apparatus and methods disclosed herein have immediate practical applicability in the field of smoke detectors. An improved smoke detector is also disclosed herein which operates on the detected amplitude of the reactant ions that are pulsed to the detector of the IBMS.

DESCRIPTION OF THE PREFERRED EMBODIMENTS

General Single Well and Two Ion Well IBMS Designed

The Ion Barrier Mobility Spectrometer (IBMS) of the present invention avoids using shutter grids and instead employs electrical fields to accomplish the following three separate operations: new ion collection, (re)positioning of these ions with the shaping of the ion barrier, and the release of the ions for their detection with a Time OF Flight (TOF) measurement to determine their mobility. The IBMS uses two timing cycles to accomplish these three operations. The first and third operations are performed during the Collection/TOF Cycle. The second operation is performed during the Compression Cycle.

Figure 1:
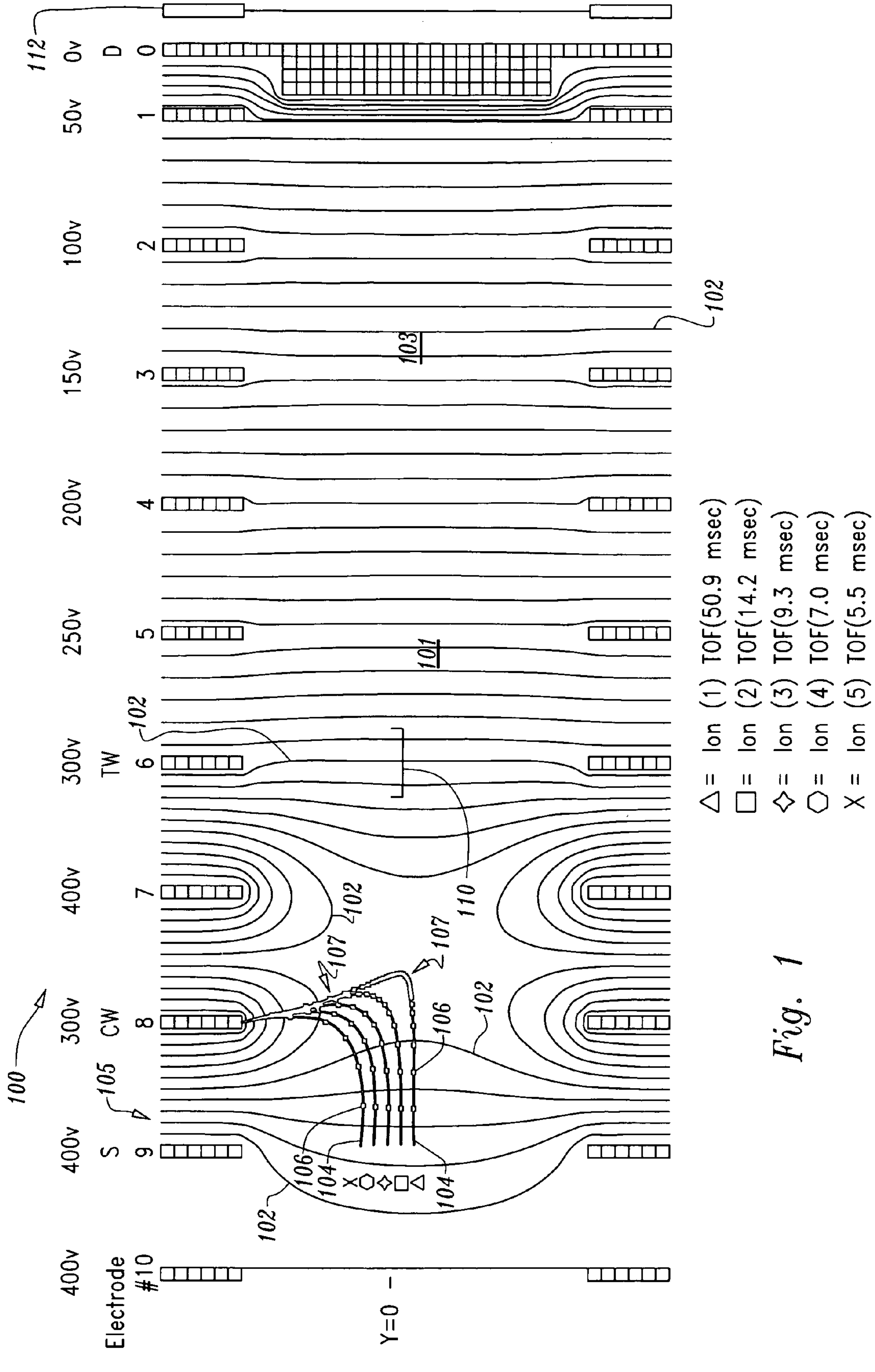
FIG. 1 is a schematic showing positive ions in a two ion well IBMS during the ion Collection portion of the Collection/TOF cycle. Trajectories of reactant ions, and the TOF of these reactant ions are shown for ions moving from the source electrode 9, labeled 'S', to the collection well electrode 8, labeled 'CW'. Ion 1 starts at Y=0. The voltages of the electrodes comprising the IBMS during this cycle are also shown.

An exemplary IBMS comprises a 1.6 in long pneumatically sealed drift tube, using ring electrodes and insulating washers, and related support electronics for high voltage and timing. A two ion well IBMS drift tube 101 was created using bronze and Teflon washers (Small Parts, U-WPB-1/2, U-WTFA-1/2), and bronze screens, shown schematically in FIG. 1. The two well IBMS apparatus 100 preferably includes a first source shield electrode (labeled "10"), a second source electrode (labeled "9"), a third collection well electrode (labeled "8"), a fourth electrode (labeled "7"), a fifth trigger well electrode (labeled "6") and a drift region 103 comprised of the area spanned by electrodes labeled "1–5". At the end of the drift region is a detector electrode (labeled "0") for detecting ions. The dimensions of the ring electrodes are approximately 1 mm thick with 13 mm holes. The electrodes are arranged and spaced as shown in FIG. 1. The apparatus 100 has cylindrical symmetry around Y–0. FIG. 1 shows simulated voltage equipotential lines 102 around the electrodes that produce the electric field. Also shown are lines 104 which represent simulated ion trajectories, as well as simulated "tick" marks 106 along each trajectory line, the tick marks representing the simulated position of ions during an interval of time comprising one msec. These trick marks 106 can be used, as will be further explained herein, to provide an approximate count of ions in transit during the time intervals comprising the Collection/TOF cycle and the Compression cycle. The equipotential lines and tick marks can be simulated using SIMION modeling software.

Figure 2:
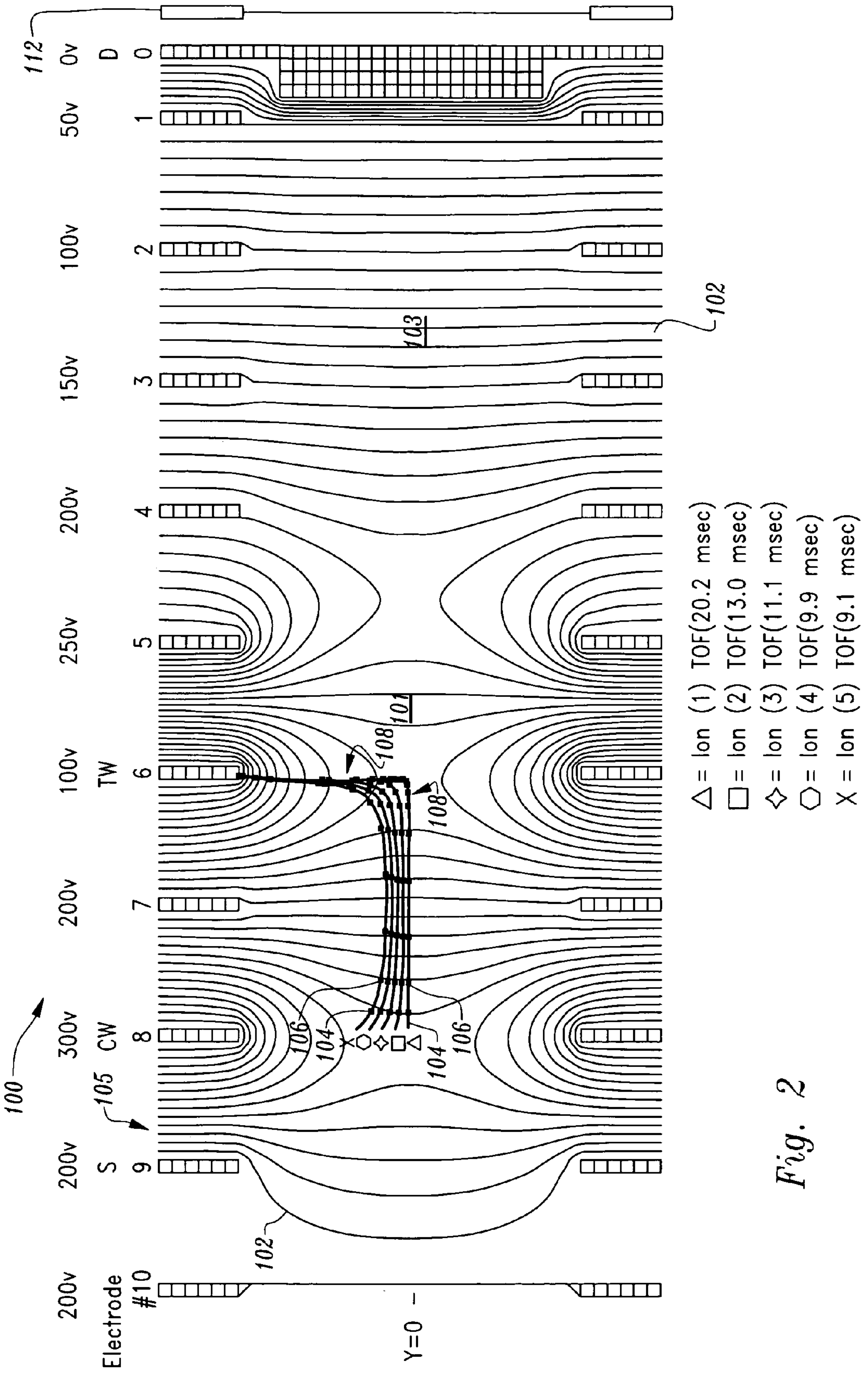
FIG. 2 is a schematic showing positive ions in a two ion well IBMS during the ion Compression cycle. Trajectories of reactant ions, and the TOF of these reactant ions are shown for ions moving from the collection well electrode 8, labeled 'CW', to the trigger well electrode 6, labeled 'TW'. 1 starts at Y+0. The voltages of the electrodes comprising the IBMS during this cycle are also shown.
Figure 3:
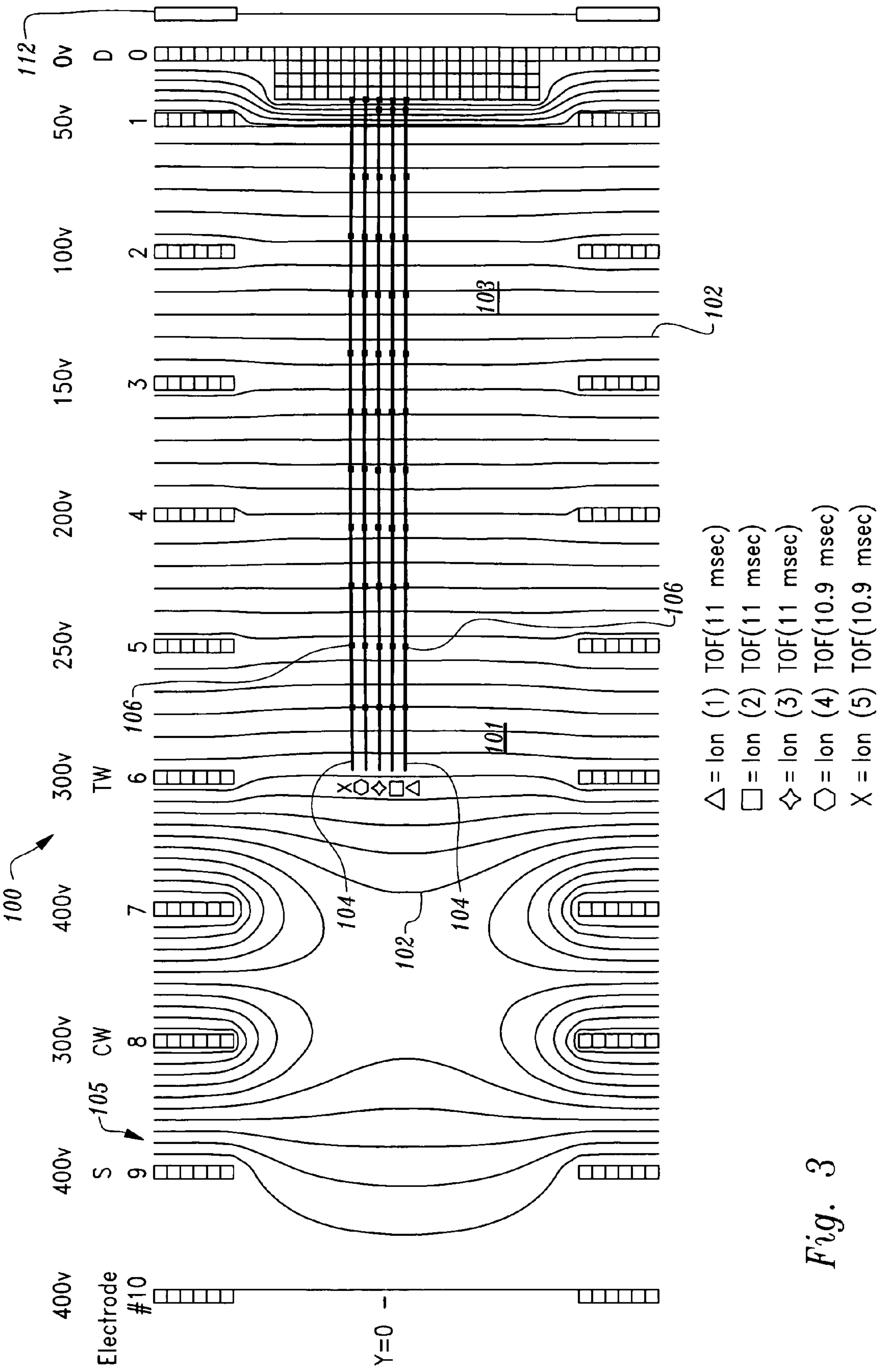
FIG. 3 is a schematic showing positive ions in a two ion well IBMS during the ion TOF portion of the Collection/TOF cycle. Trajectories of reactant ions, and the TOF of these reactant ions are shown for ions moving from the trigger well electrode 6, labeled 'TW', to detector electrode 0, labeled 'D'. Ion 1 starts at Y=0. The voltages of the electrodes comprising the IBMS during this cycle are also shown.

The direction of ion travel is from the source electrode labeled "9", to the detector labeled "0." While the associated electronics of the IBMS are not shown, this drift tube would operate in the manner herein described using the control electronics described in U.S. Pat. No. 4,855,595 by William C. Blanchard entitled "Electric Field Control in Ion Mobility Spectrometry" and incorporated herein by reference. FIGS. 1 through 3 accurately represents the reverse polarity of the voltages supplied in the drift tube to electrodes 1–10 by these electronics to accomplish the IBMS cycles. For an IBMS acting as a smoke detector a negative polarity field would be used to detect negative ions. Use of higher voltages other than those shown in FIGS. 1 through 3 would require that the voltage values at each electrode be proportionately scaled from the values shown.

The drift tube 101 is preferably mounted inside a structure (not shown) which acts as a Faraday cage that allows for gas flow. The source shield electrode 10 prevents ions from traveling from the source electrode 9 to the mounting structure. The voltage of the source shield electrode is usually maintained at the same voltage as the source electrode.

At an end opposite the source and source shield electrodes is the detector electrode 0 and the detector shield 112 which shields the detector 0 from electronic signals (noise) generated from sources other than ions traveling in the drift tube 101. The detector shield 112 can be another electrode, like the source shield or detector, but it is preferably part of the Faraday cage, as this arrangement simplifies the overall structure. The detector shield is perforated to allow for gas flow. The detector 0 detects ions traveling through the drift region 103 which is the region spanned by electrodes 1–5.

The two ion wells or barriers referred to and shown in FIGS. 1 and 2 are the regions near the collection well electrode, and the trigger well electrode, where ions can be manipulated and forced to congregate at each f the two sequentially timed cycles. Herein, the word "well" is not meant to imply a static state for the ions, as in fact the ions are dynamically moving through these regions during each cycle.

During the first cycle, called the Collection/Time of Flight (TOF) cycle, ions are created at the source 105 near the source electrode 9 and the ions are collected in a region of the apparatus 100 called the collection well 107, near the collection well electrode 8, and, at the same time, ions that were previously in a different region of the apparatus called the trigger well 108 which is near the trigger well electrode 6, are released (See FIG. 3), and drift through the drift region 103 toward the detector electrode 0. The TOF of this drift is measured. The entire Collection/TOF cycle is shown in FIGS. 1 and 3.

As shown in FIG. 2, during the second cycle, called the Compression cycle, ions that were previously stored at the collection well 107 are moved to the trigger well 108 and at the same time, ions that are continuing to be created by the source 105 are moved to the source shield 10 where they are neutralized (not shown). This neutralization prevents new ions from entering the drift tube 101 of the IBMS 100 while previously collected ions move from the collection well 107 to the trigger well 108.

For the two-well design shown in FIGS. 1–3, the ion source 105 can be a non-pulsed source such as radioactive material. The ion source for the two-well design can also be a pulsed ion source such as corona, rf, ultra-violet, or a laser.

Figure 4:
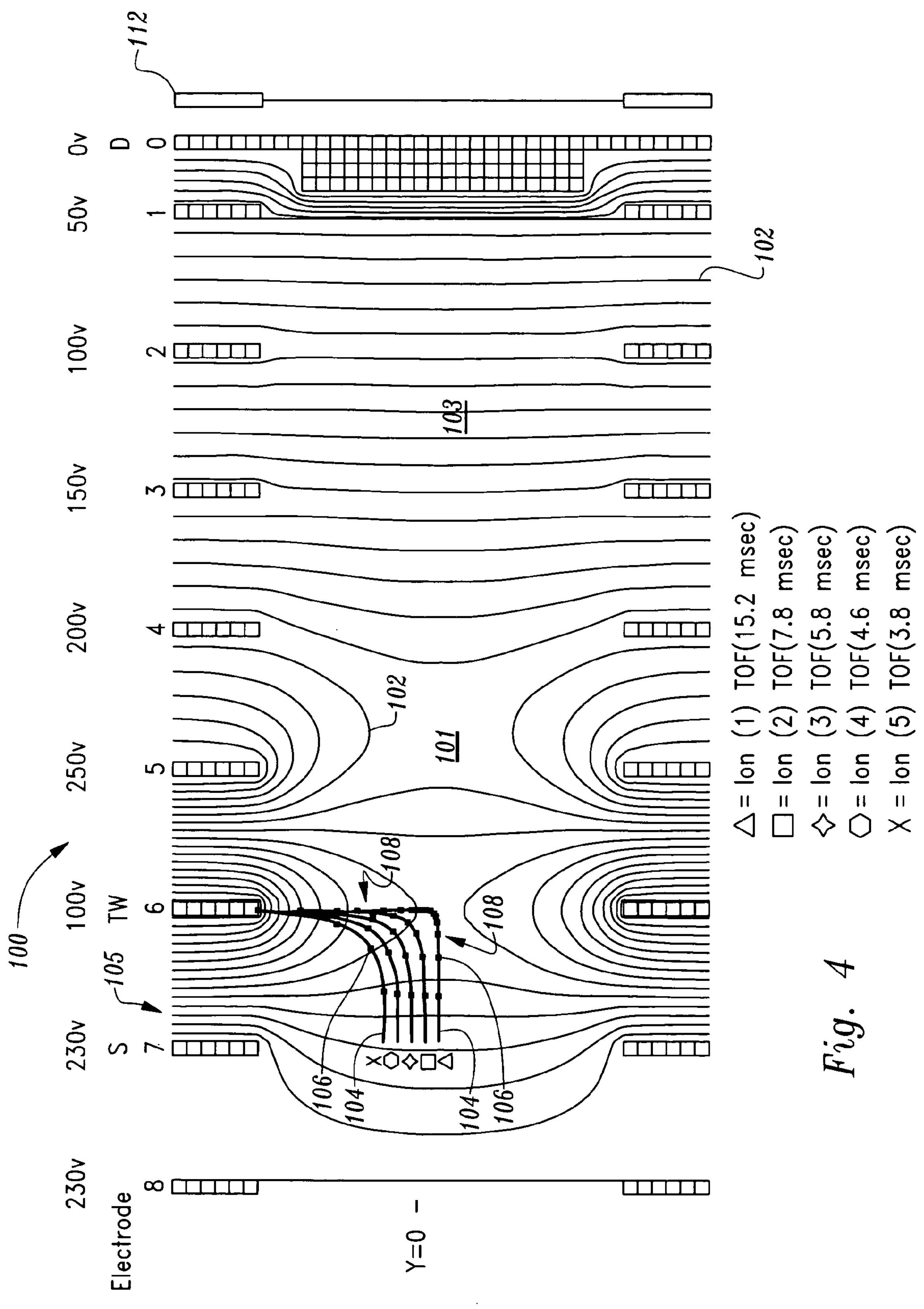
FIG. 4 is a schematic showing positive ions in a one ion well IBMS with a pulsed ion source during the ion Collection/Compression cycle. Trajectories of reactant ions, and the TOF of these reactant ions are shown for ions moving from the source electrode 7, labeled 'S', to the trigger well electrode 6, labeled 'TW.' Ion 1 starts at Y=0. The voltages of the electrodes comprising the IBMS during this cycle are also shown.

FIG. 4 illustrates a schematic lengthwise cross section through a single well drift tube 101. The single well design uses only one well 108, the trigger well, and has no collection well. Therefore, only a pulsed ion source will work, as the source is pulsed it releases a number of ions to the trigger well and negates the need for the collection step. The two-well design can store more ions then the one-well design and therefore provide greater sensitivity, as more ions are sent to the detector 0.

Drift Gas

For an IBMS smoke detector, ambient air is allowed to enter the drift tube 101 through the source shield 10, which is perforated to allow for gas flow. The gas flow rate is low and does not appreciably contribute to the reactant ion TOF drift velocity.

When the IBMS is used to measure the mobility of molecules up to 500 amu, at the ppb to ppm concentration, the inside of the drift tube must be kept very dry, approximately 10 ppb water, and clean a hydrocarbons with these being kept at approximately 0.1 ppm or less. A small quantity of this dry clean air enters the drift tube from the detector end. The drift gas is used to flush un-ionized materials from the tube.

Analyte Injection

For an IBMS operating as a smoke detector the analyte is the smoke, and the smoke and the ambient air are allowed to enter the drift tube 101 through the source shield.

For a two well IBMS operating as an IMS, the anlayte enters the drift tube 101 between the source electrode 9 and the trigger well electrode 6 depending on the mobility, charge affinity, concentration, and the chemical reaction time of the analyte. For larger molecules injection near the trigger well electrode 6 is recommended. For analytes with long chemical reaction times injection near the collection well electrode 8 is recommended. Similar conditions exist for a one well IBMS.

Operation of a Two Ion Well IBMS Apparatus

The ion collection portion of the Collection/TOF cycle is shown in FIG. 1 with five ion trajectories 104 with scaled msec time intervals. The five ions and their trajectories 104 are marked with geometric symbols in the drawing figures for easy reference. The voltages at electrodes 1 through 6 are set for a desired constant V/cm value across the drift region 103. The voltage applied to collection well electrode 8 remains constant during both cycles. Also, the same voltages are applied to electrodes 7, 9 and 10. During the Collection/TOF cycle the voltages at electrodes 7 through 10 are adjusted to achieve the design criteria of having both a flat voltage 110 across the trigger well electrode 6, and the ability to store the maximum number of ions in the vicinity of the collection well electrode 8. During this cycle, the voltage at electrode 8 is always lower than the voltages at electrodes 9 and 7. The voltages at electrode 7 and 8 are increased above the voltage at electrode 6 until the voltage across electrode 6 is nearly flat 110, as shown by the voltage equipotential lines 102 at electrode 6 in FIG. 1. The voltage at electrode 8 is then reduced to an optimum value until all the ions are trapped at electrode 8. As shown in FIG. 1, the voltage at electrode 8 has been set at 300V, while the voltage at the surrounding electrodes 7, 9 and 10 are set at 400V. It has been found that the 300 v value is near optimum for this apparatus, as setting electrode 8 at 310V or 290V results in fewer trapped ions.

The collected ions reach equilibrium at the collection well electrode 8 in approximately 51 msec. Equilibrium occurs when the quantity of ions being created by the source 105 near electrode 9 equals the number of ions reaching the collection well electrode 8. The minimum duration of the Collection/TOF cycles is at least as long as is required for equilibrium to be reached.

After equilibrium is reached, the msec time intervals can also be used to represent the location of the ions at an instant in time. The total TOF time of all trajectories 104 (e.g. the total TOF time for ions 1 through 5 in FIG. 1) is used to give a relative value to the quantity of ions that can be trapped.

For example, in FIG. 1, the total TOF from the source electrode 9 to collection well electrode 8 for ions 1 through 4 is approximately 87 msec. Observing the location of the 87 time ticks 106 and considering that at any moment in time each tick mark represents the location of an ion, the applied potentials to the electrodes can provide an ion well 107 for approximately 87N ions, where N is ions/time.

Referring to FIG. 2 a method for measuring sensitivity improvements of the IBMS 100 will now be described. For the five trajectories 104 of the collected ions from FIG. 1, (approximately 87N), there will be approximately 75N ions moved from the collection well 107 to the trigger well 108, due to some reaching the trigger well electrode and being neutralized, as shown in FIG. 2. These 75 N ions will then be released for detection. A Conventional shutter grid IMS typically will use a 100 msec injection pulse, over the similar five trajectories, and this will result in the injection of 0.5N ions. The sensitivity improvement of the IBMS over a comparable IMS can then be estimated in terms of a ratio of approximately 75N/0.5N or 150:1.

Referring still to FIG. 2 the Compression cycle can be illustrated. During the Compression cycle, ions that were collected near the collection well electrode 8, during the Collection/TOF cycles are moved near the trigger well electrode 6. The voltages at electrodes 6, 7, 9 and 10 are adjusted to achieve the following three design criteria: 1) a flat ion storage well (ion barrier) 108 across the trigger well electrode 6; (2) a short cycle time; and 3) stopping ions located between the source electrode 9 and the collection well electrode 8 from reaching the trigger well region 108. The voltage at electrode 6 affects the cycle time and is maintained below the voltage at electrode 5. The voltage at electrode 7 is kept between the voltages at electrodes 6 and 8 and is adjusted to produce a flat ion barrier 108 across trigger well electrode 6. A flat vertical ion barrier 108, as shown, provides minimal broadening of the final detected signal.

As shown in FIG. 2, the voltage at electrode 6 has been set at 100 v. The voltage at electrode 7 has been set at 200 v. Adjusting electrode 7 to a higher voltage of 210 v will cause the ion barrier 108 to bow toward the detector 0, while a lower voltage of 190 v will cause the ion barrier 108 to bow toward the source electrode 9. By refining the voltage applied to electrode 7, the ion barrier 108 can be configured to the flat vertical shape shown in FIG. 2, thereby achieving an increased detected signal with a minimal amount of signal broadening.

During the Compression cycle it is preferred that the source 9 and shield 10 electrodes track the voltage applied to electrode 7, thereby preventing new ions from continually entering the drift tube during the Compression cycle. It can be shown that there is a location between electrode 8 and electrode 9 where ions closer to electrode 9 will move toward the source shield electrode 10 and be neutralized. Also ions closer to electrode 8 will move toward the trigger well electrode 6. This configuration prevents ion drift from the trigger well electrode 6 back to the source electrode 9, thereby holding the ions at the trigger well electrode against the ion barrier 108 prior to their release into the drift region.

The duration of the Compression cycle is adjusted to allow the largest quantity of ions to be trapped in the trigger well 108. The optimum Compression cycle time will be approximately equal to the trajectory TOF of ion 5 which in FIG. 2 is 9 msec.

The ions at the trigger well in FIG. 2 are released at the start of a new Collection/TOF cycle, as shown in FIG. 3. These reactant and analyte ions move from the trigger 108 well toward the detector electrode 0 at their mobility velocity, and their TOF and quantity is measured by the methods described previously for the Collection/TOF cycle.

Operation of a Single Ion Well IBMS Apparatus

With a one ion well design, a pulsed source is used such as corona, ultra-violet, rf, or a laser. The pulsed source negates the need for a collection well. Again, as with the two ion well design, two sequentially time cycles are used: 1) during the first cycle called the Collection/Compression cycle, ions are created by a pulsed source 105 which is turned on and the ions are collected and compressed in a section of the apparatus called the trigger well 108; and 2) during the second cycle called the TOF cycle, the pulsed source 105 is turned off and ions that were previously at the trigger well 108 are released and drift toward the detector 0. This TOF of the ions traveling from the trigger well to the detector is measured.

FIG. 4 illustrates the Collection/Compression cycle for the one ion well IBMS apparatus 100. The apparatus incorporates a suitable source shield electrode 8, to isolate the electric field inside the apparatus. Ions are introduced at the source electrode 7 and at equilibrium terminate their travel at the trigger well electrode 6. The pulsed source 105 can be turned off just before the TOF cycle starts, thereby allowing ions in transit to be trapped at the trigger well electrode 6. As with the two-well design, the total TOF time of all trajectories 104 (e.g. the total of ions 1 through 5 in FIG. 4) can be used to give a relative value to the quantity of ions that can be trapped. In a single well design, the collection well and trigger well are combined into the trigger well 108 near electrode 6. A flat ion barrier 108 is created to trap ions by keeping the voltages at source electrode 7 and electrode 5 significantly higher than electrode 6. Here, shown in FIG. 4 the shield 8 and source 7 electrodes are kept at 230 v, electrode 6 at 100 v and electrode 5 at 250 v. As with the two-well design, the flatter the ion barrier 108, the more improved the signal resolution will be for the single well design.

For the one well design, the TOF cycle is similar to that shown in FIG. 3. The voltages applied during the TOF cycle are 350 v at the source electrode 7 and shield electrode 8. At electrode 6, the trigger well electrode, a 300 v potential is applied. Electrodes 1 through 5 remain at the voltages shown in FIG. 4 during the TOF cycle, thereby creating the drift region 103 having detector 0 as a final destination for the traveling ions.

Use of an IBMS Apparatus as a Smoke Detector

Present smoke detectors operate on the principal of breaching the electrical pathway created by charged ions emanating from a radioactive source such as $^{241}$Am. When smoke mixes with the reactant ions, the smoke captures the charge from many of these reactant ions. The ionized smoke particles are much larger and slower (mobility in the electric field is slowed) and not of a uniform mobility as are the reactant ions. This results in a rapid reduction in quantity of the much faster reactant ions reaching the detector electrode and acts as a breach, or partial breach, of this electrical pathway. This breach causes the smoke detector alarm to sound. A shortcoming of the prior art is that grease and dirt can collect in a smoke detector, over time, and cause a second electrical current pathway, exclusive of the normal reactant ion current pathway. As such, when smoke is introduced, the detected reactant ion signal will still experience a reduction, but the smoke detector will be “fooled” by the unbroken current pathway caused by the grease and dirt, into thinking that it is still receiving sufficient reactant ions, causing the alarm to remain “off” in smoke-filled conditions.

The IBMS apparatus does not operate using a continuous reactant ion current pathway, but instead operates on the detected amplitude of the reactant ions that are pulsed to the detector 0. The reactant ions in an IBMS smoke detector are charged water clusters. Smoke captures the charge from many reactant ions as noted previously, but the remaining reactant ions are collected and then released to the detector 0 as a pulse. A change in pulse amplitude, rather than a partial disruption in electrical pathway, triggers the smoke detector alarm to sound. For the IBMS, if a second electrical pathway to the detector forms, that current will only contribute to the apparatus detector noise level and will not prevent the smoke alarm from sounding during a fire.

Figure 5:
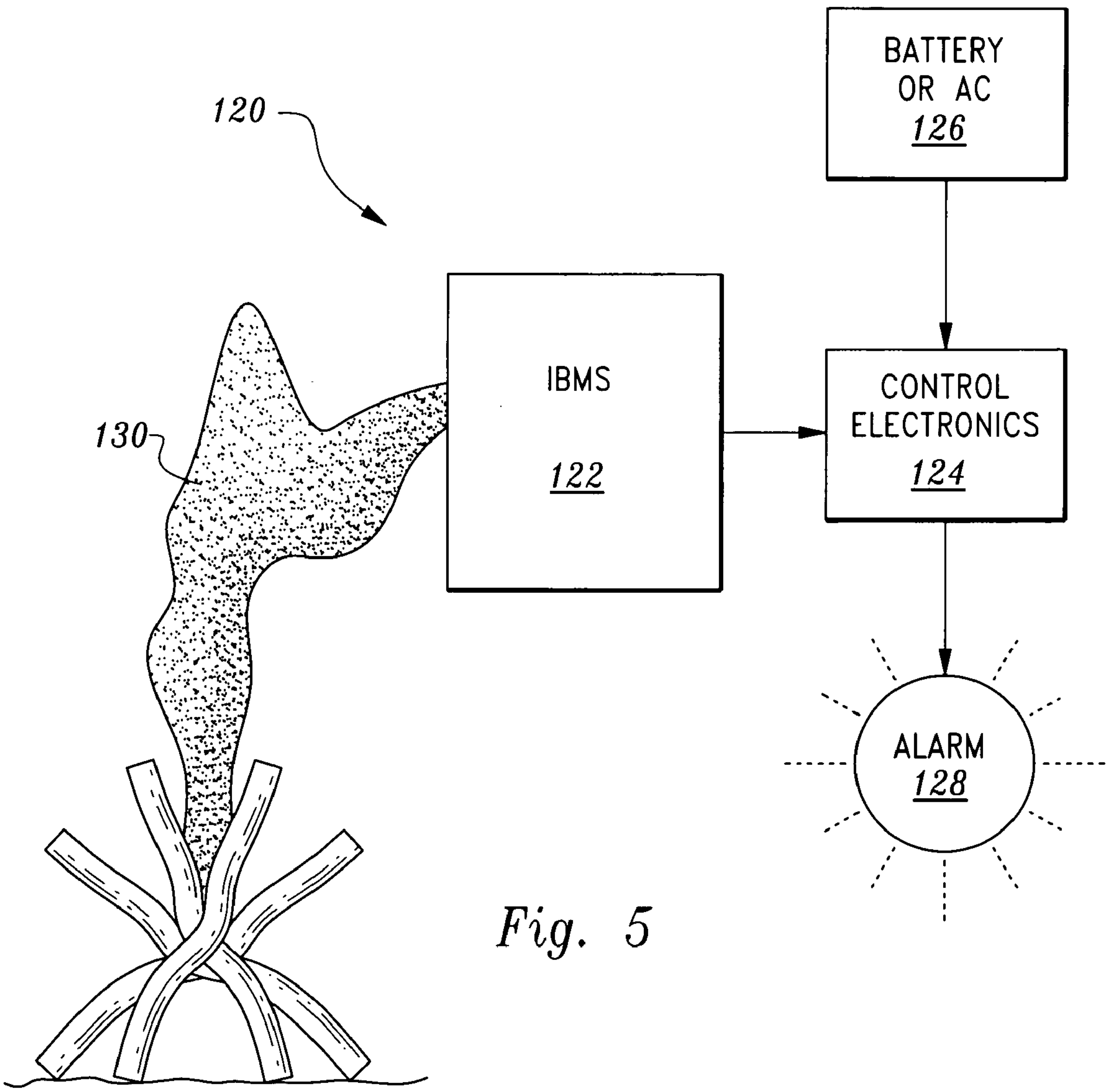
FIG. 5 is a block diagram of an IBMS smoke detector.

FIG. 5 is a block diagram of how an IBMS, as herein described, could be used as a sensor in a smoke detector. The smoke detector 120 is comprised of an IBMS 122 which is operatively connected to control electronics 124, the smoke detector 120 being powered by a battery or AC power 126. The control electronics would operate the IBMS 122 in the manner described herein, and would also send a signal to activate the alarm 128 should the pulse amplitude of detected ions drop due to smoke 130 entering the IBMS 122.

The IBMS apparatus along with its various forms, methods and applications disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention.

The invention claimed is:

1. An ion barrier mobility spectrometer apparatus, comprising:

a) an ion source supplying an unobstructed flow of ions;

b) means for creating a first electric field ion barrier for collecting ions flowing from said ion source;

c) means for creating a second electric field ion barrier for positioning ions collected from said first ion barrier;

d) means for adjusting the configuration of said second ion barrier;

e) a detector for detecting said released ions; and f) a source shield, said source shield eliminating ions produced by said ion source.

2. The apparatus of claim 1, wherein said ion source is a non-pulsed source.

3. The apparatus of claim 1, wherein said ion source is a pulsed source.

4. The apparatus of claim 1, wherein said means for adjusting said second ion barrier causes said second ion barrier to achieve a flat, vertical configuration.

* * * * *